Dec. 9, 1969     H. GLASSCHROEDER     3,482,282
FLANGING TOOL
Filed Feb. 7, 1968     2 Sheets-Sheet 1
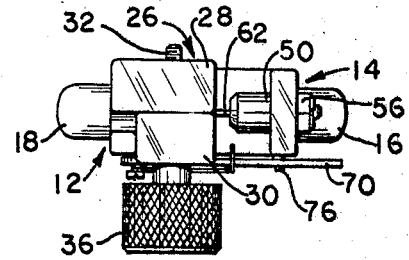
FIG_3
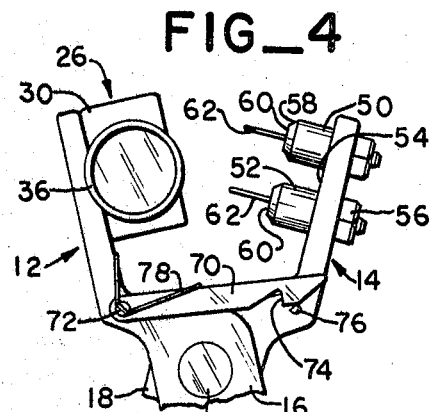
FIG_4
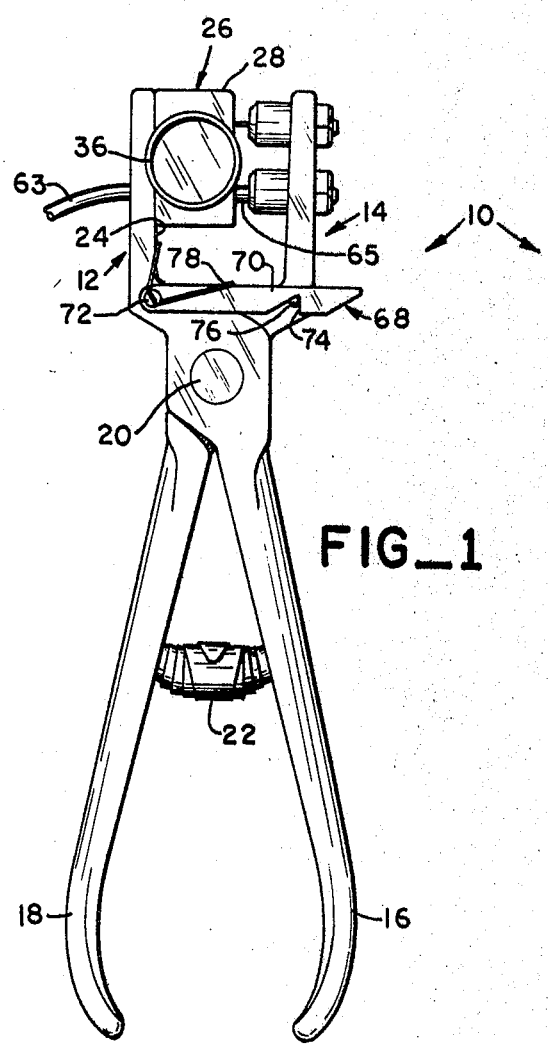
FIG_1
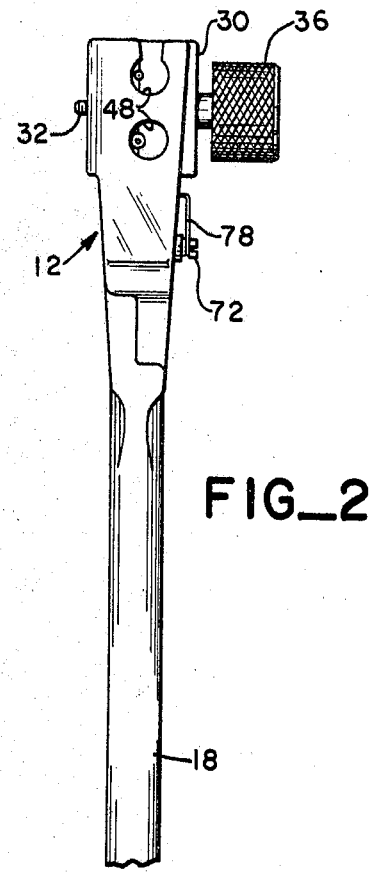
FIG_2
INVENTOR.
HANS GLASSCHROEDER
BY
*Townsend and Townsend*
ATTORNEYS

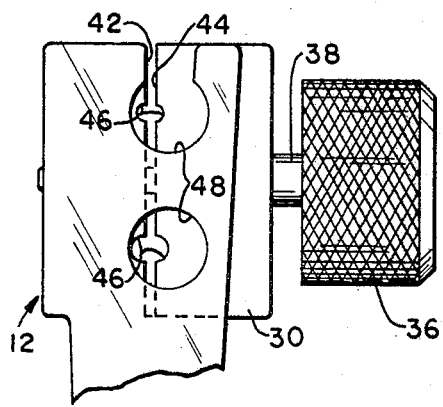
FIG_5
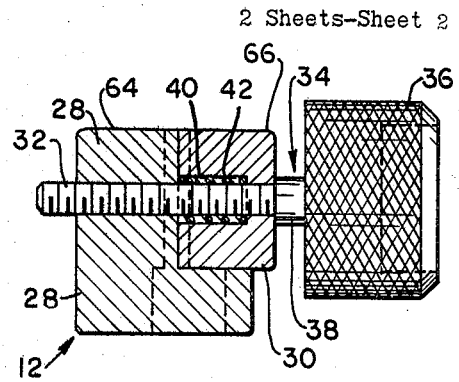
FIG_6
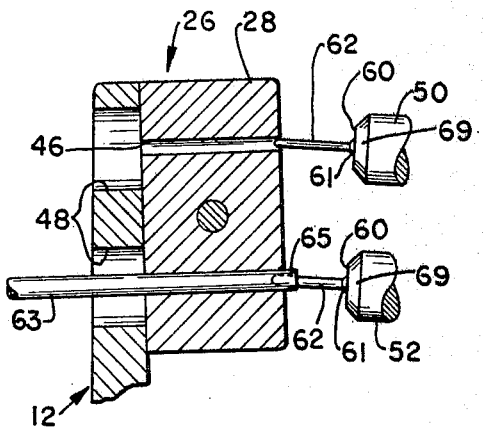
FIG_7
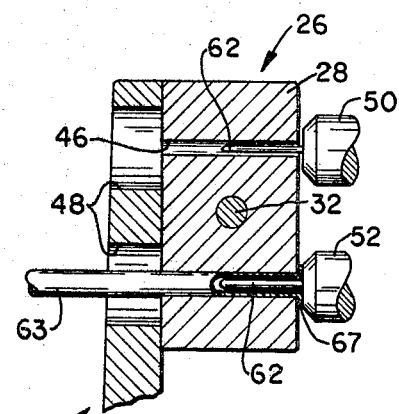
FIG_8
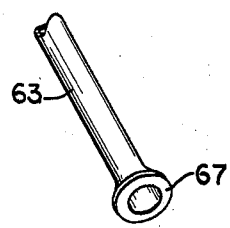
FIG_9
INVENTOR.
HANS GLASSCHROEDER
BY
*Townsend and Townsend*
ATTORNEYS United States Patent Office 3,482,282
Patented Dec. 9, 1969

3,482,282
FLANGING TOOL
Hans Glasschroeder, Munich, Germany, assignor to Bio-Cal Instrument Company, Richmond, Calif., a corporation of California
Filed Feb. 7, 1968, Ser. No. 703,638
Int. Cl. B29c 17/00
U.S. Cl. 18—19                                                    12 Claims

ABSTRACT OF THE DISCLOSURE

A tool for forming a flange at one end of a plastic tube wherein a tube holder having an outer backing surface is carried on one of a pair of relatively shiftable jaws and an abutment is carried on the other jaw. The tube is held by the holder with an end portion of the tube extending outwardly from the backing surface so that the abutment forcibly engages the end portion of the tube against the backing surface when the jaws are brought together to thereby form the flange. The jaws are biased away from each other and a releasable lock on the jaws maintains the jaws a fixed distance apart to provide for the gauging of the length of the end portion of the tube to be flanged.

---

This invention relates to improvements in hand-held tools, and, more particularly, to a tool for forming a flange at one end of a plastic tube.

The invention is directed to structure capable of holding a bendable plastic tube to be flanged in a fixed position and then forcing a fixed length of one end portion of the tube against a backing surface. In this way, the end portion of the tube is forced toward the backing surface and moves radially outwardly of the longitudinal axis of the tube in all directions to thereby form the annular flange which is substantially uniform in size and shape throughout its circumferential length.

In its preferred embodiment, the invention is constructed in a manner similar to conventional pliers or wire cutters in that a pair of jaws carried by two pivoted handles are moved together. To utilize this simple motion for the flanging of a plastic tube, an abutment is carried by one jaw to force an end portion of a plastic tube against a backing surface of a tube holder carried by the other jaw. The tube is fixedly held in the tube holder and the abutment is shaped to provide a substantially uniform force on the end portion of the tube. In this way, the resulting flange will be substantially uniform in size and shape and will extend radially from the tube in all direction.

Means is provided on the jaws to pre-set the locations of the same before the jaws are moved together to form a flange. In this way, the length of the end portion of the tube to be flanged can be gauged to provide for the proper flanging action. The jaws are also biased away from each other and the means which pre-sets the jaws is self-actuating when the jaws move against the bias force. Thus, the proper length can automatically be assured before the tube is gripped by the holder.

In connecting plastic tubes in fluid flow lines or the like, the tubes generally must be flanged at their ends to obtain the proper seal. This seal is effected by forcing the flanged end of a tube tightly against an adjacent surface, such as the end face of a connector or coupling unit.

Heretofore, there has been no entirely satisfactory way of flanging plastic tubes, especially small diameter tubes. The need for flanging tool arises frequently in laboratories where it is often necessary to cut a tube into short lengths for specific uses, with each length requiring flanges at its ends. Conventional tools have not been successfully used for this purpose because they cannot form a flange having uniformity in size and shape. The only available flanging apparatus requires heating of the plastic and is complex and costly.

The present invention provides a tool for quickly and easily forming a flange at one end of a plastic tube with the resulting flange being substantially uniform in width and in wall thickness. The invention provides for these desired results by the use of a hand-held tool which can be used even by one having no special skills in handling plastic tubes. Also, the tool can be used with tubes of different plastic materials and with tubes of various sizes. In all cases, the flange formed by the action of the tool will be uniform in size and shape and the flange-making step can be accomplished without damaging the wall structure of the tube.

The primary object of the invention is, therefore, to provide a tool for forming a flange at one end of a plastic tube in a simple and expeditious manner and without damaging the tube while at the same time assuring that the flange will be uniform in size and shape.

Another object of the invention is to provide a flange-making tool which is held and operated in the same manner as conventional pliers or wire cutters so that the flange-making step involves only a simple hand operation notwithstanding the fact that the tube to be flanged is tightly gripped and the resulting flange is uniform in size and shape.

Still another object of the invention is to provide a tool of the type described wherein the tool operates to force one end portion of a plastic tube against a backing or supporting surface while the tube is held in a fixed position, so that the end portion of the tube will be directed outwardly and against the backing surface to form the flange having the desired size and shape.

Other objects of the present invention will become apparent as the following specification progresses, reference being had to the accompanying drawings for an illustration of a preferred embodiment of the invention.

In the drawings:

FIG. 1 is a side elevational view of the tool;

FIG. 2 is an elevational view of the tool rotated 90° from the view shown in FIG. 1;

FIG. 3 is an end elevational view of the tool looking downwardly on the tool in FIG. 1;

FIG. 4 is a fragmentary view similar to FIG. 1 showing the jaws of the tool spaced apart;

FIG. 5 is an enlarged fragmentary view similar to the view of FIG. 2 and showing details of the tube holder;

FIG. 6 is a cross-sectional view taken through the tube holder;

FIG. 7 is a cross-sectional view through another plane passing through the tube holder and illustrating how a tube to be flanged is held thereby;

FIG. 8 is a view similar to FIG. 7 but showing the condition of the tube after the latter has been flanged; and FIG. 9 is a perspective view of the flange and of a plastic tube.

The tool of the present invention is broadly denoted by the numeral 10 and is shown in its entirey in FIG. 1. Tool 10 comprises a pair of generally spaced jaws 12 and 14 carried on the proximal ends of handles 16 and 18, respectively. The handles are pivotally connected together by a pin 20 in a manner such that jaws 12 and 14 will move toward and away from each other as the handles are moved in opposite directions. A spring 22 disposed between handles 16 and 18 biases the latter apart, whereby jaws 12 and 14 are biased away from each other.

Jaw 12 has a generally flat inner surface 24 on which is secured a tube holder 26 having a pair of relatively shiftable tube-gripping members 28 and 30. Member 28 is rigidly connected to jaw 12 and rotatably receives the shank 32 of a bolt 34 having a knurled head 36. Shank 32 extends through and rotates relative to member 30 (FIG. 6) and has a collar 38 between member 30 and head 36 which forces member 30 toward and against member 28 when shank 32 is advanced to the left when viewing FIG. 6. Member 30 has a counterbore 40 therein which receives a coil spring 42. This spring surrounds shank 32 and is normally under compression so that it biases member 30 away from member 28.

Holder 26 is constructed to accommodate plastic tubes of at least two different sizes. To this end, the facing surfaces 42 and 44 of members 28 and 30, respectively (FIG. 5), are provided with two sets of generally semicircular grooves 46 with the grooves of one set having a depth greater than those of the other set. Respective grooves are aligned with and extend parallel to each other so that a tube can be disposed in a corresponding pair of grooves. The gripping action of gripping members 28 and 30 is sufficient to hold the tube substantially immovable relative to holder 26 without causing collapse of the wall of the tube. The selection of the groove pair to be used will be determined by the outer diameter of the tube to be held. Jaw 12 is provided with openings 48 which are in alignment with respective groove pairs so that a tube held by holder 26 may project laterally and outwardly from jaw 12 in the manner shown in FIGS. 7 and 8.

Jaw 14 is provided with a pair of abutments 50 and 52 on the generally flat face 54 of jaw 14, there being an abutment for each pair of adjacent grooves 46, respectively. Each of these abutments projects inwardly from surface 54 and is rigidly secured to jaw 14 in any suitable manner, such as by a threaded connection using nuts 56 engageable with the outer face of jaw 14. Each of the abutments 50 and 52 has a generally flat face 60, a rod-like guide 62 rigid to and projecting outwardly from face 60 in a direction toward holder 26, and an annular, flared fairing 61 at the junction of face 60 and guide 62. Guide 62 has an outer diameter substantially equal to the inner diameter of the tube to be flanged (FIG. 8). The purpose of guide 62, therefore, is to enter the end of a bendable plastic tube 63 held by holder 26 and to guide face 60 toward the tube and also to support the tube during the flanging action. Fairing 61 initiates the flanging action since it is shaped to urge the end of tube 63 outwardly as the corresponding abutment is moved toward the tube. A conical surface 69 surrounding face 60 contributes also to the flanging action since it allows the outermost annular margin of end portion 65 to be relieved of excessive strain which, if prolonged, might cause the rupture of the tube wall. In view of the foregoing, therefore, end portion 65 will properly be engaged by the abutment and forced against the backing surface defined by the outer faces 64 and 66 (FIG. 6) of gripping members 28 and 30. In this view, the adjacent end portion 65 of the tube is caused to be bent toward, against, and along the aforesaid backing surface when jaws 12 and 14 are forced together to thereby form a flange 67 on the end of the tube.

To guage the proper length of the end portion of a tube before it is flanged, a releasable lock 68 is provided for the jaws. This lock holds the jaws at a fixed distance apart so that a tube in one of the groove pairs 46 can be fixed to the holder with the end portion projecting outwardly from faces 64 and 66 by the proper amount to form the desired flange. To this end, lock 68 includes an arm 70 pivotally mounted by a pin 72 on jaw 12. The arm extends toward jaw 14 and has a notch 74 therein for receiving a pin 76 extending laterally from jaw 14, whereby the lock is self-actuating when the jaws are moved toward each other.

The gauging of the end portion of a tube is oftentimes highly desirable for tubes of certain materials and wall thicknesses; otherwise, the flange may not be properly formed. If end portion 65 is too long, the tube may have an annular "bubble" or enlarged portion adjacent to the flange caused by the collapse of a segment of the end portion. If the end portion is too short, the resulting flange may not have the proper width or radial dimension.

In use, a plastic tube 63 to be flanged is loosely received into the proper groove pair 46 in the manner shown in FIGS. 7 and 8. Handles 16 and 18 are then moved toward each other from the position shown in FIG. 4 to the positions shown in FIG. 1. In moving between these positions, the corresponding guide 62 enters the tube and the jaws continue to move together until arm 70 is permitted to move in a direction so that notch 74 receives pin 76. When this occurs, flat face 60 of the corresponding abutment will be the proper distance away from faces 64 and 66. The tube will then be urged against face 60 to provide for the proper length end portion 63 or the face itself will force the tube into the grooves if the end portion of the tube is initially too long.

With the proper length for the end portion 82, gripping member 30 is then forced against gripping member 28, whereby the tube will be releasably gripped or held in a fixed position relative to jaw 12. Handles 16 and 18 are then forced together to force the abutment into the position shown in FIG. 8, whereby the end portion 65 is bent radially outwardly in all directions and against and along the backing surface to form the desired flange 67 on the end of tube 80. The end portion of the tube will undergo a substantially permanent set at the flange, so that flange 67 will remain intact when the jaws are separated and when member 30 is backed off from member 28 to allow tube 63 to be separated from tool 10.

Tool 10 provides a simple hand-operated structure for forming a flange on a plastic tube in a minimum of time and with a minimum of effort. Also, the tool can be used by one having no special skills with the handling of plastic tubes, and different types and sizes of tubes can be flanged with the tool. The operation of the tool is simplified because of its similarity in operation to conventional pliers and wire cutters wherein a pair of jaws are shifted toward each other by manipulation of a pair of pivotally coupled handles.

While one embodiment of this invention has been shown and described, it will be apparent that other adaptations and modifications can be made without departing from the true spirit and scope of the invention.

What is claimed is:

1. A tool for forming a flange on one end of a bendable plastic tube comprising: a pair of jaws; means mounting the jaws for movement toward and away from each other; means on one of the jaws to present an outer backing surface and for releasably holding a tube to be flanged in a fixed position with one end portion of the tube extending outwardly from said backing surface; and means on the other jaw for engaging said end portion of the tube and for forcing the same toward and against said supporting surface when said jaws move in one sense relative to each other, whereby the end portion of the tube will be bent toward and along said backing surface to form a flange.

2. A tool as set forth in claim 1, wherein is provided means biasing said jaws in a direction opposite to said one sense.

3. A tool as set forth in claim 1, wherein said jaws are movable toward each other to cause the end portion of a tube to be forced against said supporting surface when the tube is held by said holding means, said jaws being biased away from each other, and wherein is included a lock coupled to said jaws for releasably maintaining the same a predetermined distance apart, whereby the length of the portion of the tube to be flanged can be gauged.

4. A tool as set forth in claim 1, wherein is included a guide on said forcing means for movements onto the end portion of the tube to align the latter and said forcing means.

5. A tool for forming a flange on one end of a bendable plastic tube comprising: a tube holder having an outer surface; an abutment; and means mounting the tube holder and the abutment for movement relative to each other with said outer surface and said abutment being movable toward and away from each other, whereby one end portion of a tube held by said tube holder and extending outwardly from said surface will be flanged when the abutment forces said one end portion against said outer surface.

6. A hand-held tool for forming a flange on one end of a bendable tube comprising: a pair of jaws; a handle for each jaw, respectively, the handles being pivotally coupled together to permit said jaws to move toward and away from each other; a tube holder carried by one of the jaws and having an outer surface in facing relationship to the other jaw, said holder having means for releasably and fixedly holding a tube to be flanged with one end portion of the tube projecting laterally from said outer surface; means defining an abutment on the other jaw for forcibly engaging the end portion of a tube held by said holder when the said handles are shifted to move the jaws toward each other; and means carried by said abutment means and disposed for insertion into the projecting end portion of the tube for supporting the latter as the abutment engages the same, whereby the end portion of the tube will be forced by the abutment against said outer surface to form a flange on the tube.

7. A tool as set forth in claim 6, wherein said abutment includes a projection extending toward said one jaw and having a tube-engaging face, said supporting means including a rod projecting outwardly from said face.

8. A tool as set forth in claim 7, wherein said face is substantially flat, and including a fairing at the junction of said face and said rod, said fairing being disposed to shift the outer annular margin of said end portion of the tube outwardly of the rod.

9. A tool as set forth in claim 8, wherein said abutment is provided with a conical surface surrounding the outer periphery of said flat face and extending outwardly and away therefrom.

10. A tool as set forth in claim 6, wherein said holder includes a pair of relatively shiftable gripping members movable toward and away from each other, and means for moving one of the members toward the other member to grip a tube therebetween.

11. A tool as set forth in claim 10, wherein the gripping members have adjacent, generally flat outer faces defining said outer surface of the holder, said members having adjacent, generally flat inner faces, each inner face having a tube-receiving groove, the grooves of the members being in alignment with each other.

12. A hand-operated tool for forming a flange at one end of a bendable, plastic tube comprising: a pair of handles; means pivotally mounting the handles for movement toward and away from each other; a jaw for each handle, respectively, the jaws being secured to respective handles and being shiftable toward each other when the handles are moved together; means biasing said handles away from each other; a tube holder carried by one of the jaws, said holder having a pair of relatively shiftable tube gripping members, and means coupled with the members for moving the same toward and away from each other, each member having an inner surface provided with a pair of spaced, generally parallel grooves disposed transversely of said one jaw, one of the grooves having a depth greater than that of the other groove, the grooves of one member being aligned with, opposed to and extending longitudinally of respective grooves in the other member, whereby the grooves will accommodate tubes of at least two different diameters, each member having an outer, generally flat surface extending transversely of the grooves thereof, said outer surface of one member being substantially aligned with said outer surface of the other member; a pair of abutments carried by the other jaw in substantially arcuate alignment with respective, opposed grooves of said holder, each abutment having a generally flat face substantially parallel to said outer surfaces of the members when the abutment is in proximity thereto; and a guide rod on the flat face of each abutment, respectively, each guide rod movable into the end portion of a tube on the holder for aligning the end portion of the tube and the flat face of the corresponding abutment, whereby the end portion of a tube held in one pair of grooves of said holder will be engaged by said flat face of the corresponding abutment and bent outwardly of and along said outer surfaces of said members to form a flange.

References Cited
UNITED STATES PATENTS

| | | | |
|---|---|---|---|
| 1,661,367 | 3/1928 | Helmunak. | |
| 1,795,358 | 3/1931 | Arndt | 72—316 XR |
| 1,935,714 | 11/1933 | Hummell | 72—316 |
| 2,277,410 | 3/1942 | Neulserih | 72—316 |
| 3,335,484 | 8/1967 | Parker et al. | 18—19 |
| 3,341,894 | 9/1967 | Flaming | 18—19 |

WILLIAM J. STEPHENSON, Primary Examiner

U.S. Cl. X.R.

72—316